US009256658B2

(12) United States Patent
Castaneda

(10) Patent No.: US 9,256,658 B2
(45) Date of Patent: Feb. 9, 2016

(54) RANGING SCALABLE TIME STAMP DATA SYNCHRONIZATION

(75) Inventor: Frank J. Castaneda, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 13 days.

(21) Appl. No.: 13/184,743

(22) Filed: Jul. 18, 2011

(65) Prior Publication Data

US 2011/0276536 A1    Nov. 10, 2011

Related U.S. Application Data

(62) Division of application No. 11/179,139, filed on Jul. 12, 2005, now Pat. No. 8,001,076.

(51) Int. Cl.
*G06F 17/30* (2006.01)
(52) U.S. Cl.
CPC ................................. *G06F 17/30575* (2013.01)
(58) Field of Classification Search
CPC ................................................. G06F 17/30575
See application file for complete search history.

(56) References Cited

U.S. PATENT DOCUMENTS

| | | | |
|---|---|---|---|
| 5,924,096 A | | 7/1999 | Draper et al. |
| 5,937,413 A | | 8/1999 | Hyun et al. |
| 6,023,769 A | * | 2/2000 | Gonzalez ...................... 713/400 |
| 6,065,018 A | | 5/2000 | Beier et al. |
| 6,141,664 A | * | 10/2000 | Boothby |
| 6,295,441 B1 | | 9/2001 | Bjorkengren |
| 6,295,541 B1 | * | 9/2001 | Bodnar et al. |
| 6,711,693 B1 | * | 3/2004 | Golden et al. ................ 713/400 |
| 6,718,348 B1 | * | 4/2004 | Novak et al. .................. 707/621 |
| 6,727,927 B1 | | 4/2004 | Dempski et al. |
| 6,829,534 B2 | * | 12/2004 | Fuchs et al. .................... 701/213 |
| 6,839,564 B2 | * | 1/2005 | Sutinen et al. ................ 455/502 |
| 7,023,884 B2 | * | 4/2006 | Chuah et al. ................... 370/507 |
| 7,136,935 B2 | * | 11/2006 | Rao .............................. 709/250 |
| 7,158,991 B2 | * | 1/2007 | Kekre et al. |
| 7,165,059 B1 | * | 1/2007 | Shah et al. |
| 7,190,946 B2 | * | 3/2007 | Mazzara et al. ........... 455/404.1 |
| 7,202,776 B2 | * | 4/2007 | Breed ........................... 340/435 |
| 7,239,581 B2 | * | 7/2007 | Delgado et al. ................ 368/10 |
| 7,257,133 B2 | * | 8/2007 | Jeske et al. .................... 370/507 |
| 7,412,658 B2 | | 8/2008 | Gilboa |

(Continued)

OTHER PUBLICATIONS

Emmanuelle Anceaume and Isabelle Puaut, "A Taxonomy of Clock Synchronization Algorithms", Research report IRISA No. PI1103, Jul. 1997.*

*Primary Examiner* — Grace Park
(74) *Attorney, Agent, or Firm* — Steven M. Greenberg, Esq.; CRGO Law

(57) ABSTRACT

Embodiments of the present invention address deficiencies of the art in respect to time stamp based data synchronization and provide a method, system and computer program product for scalable, ranging time stamp based data synchronization. In an embodiment of the invention, a ranging time stamp synchronization method can include computing a time range for a specified time, and producing time stamp synchronization anchors using the time range for each of the anchors. Optionally, a drift value can be computed for the time range and the computing and producing steps can be repeated when the drift value exceeds a threshold. Finally, the anchors can be used to determine whether to update data items in a remote data source in the remote host computing platform with data items from a primary data source in the primary host computing platform.

20 Claims, 3 Drawing Sheets

(56) References Cited

U.S. PATENT DOCUMENTS

| | | | |
|---|---|---|---|
| 2002/0069076 A1* | 6/2002 | Faris et al. | 705/1 |
| 2002/0161769 A1* | 10/2002 | Sutinen et al. | 707/10 |
| 2003/0005342 A1* | 1/2003 | Thomas et al. | 713/400 |
| 2003/0055807 A1* | 3/2003 | Lomet | 707/1 |
| 2003/0212821 A1* | 11/2003 | Gillies et al. | 709/238 |
| 2004/0077311 A1* | 4/2004 | Riley | 455/12.1 |
| 2004/0128701 A1 | 7/2004 | Kaneko et al. | |
| 2004/0153473 A1* | 8/2004 | Hutchinson et al. | 707/104.1 |
| 2004/0205263 A1* | 10/2004 | Sivaraman et al. | 710/21 |
| 2004/0225694 A1* | 11/2004 | Flanagin et al. | 707/201 |
| 2004/0230862 A1* | 11/2004 | Merchant et al. | 714/6 |
| 2004/0260735 A1* | 12/2004 | Martinez et al. | 707/204 |
| 2005/0125459 A1* | 6/2005 | Sutinen et al. | 707/201 |
| 2005/0135429 A1* | 6/2005 | Bingham et al. | 370/503 |
| 2005/0259693 A1* | 11/2005 | Auriemma et al. | 370/503 |
| 2006/0041545 A1 | 2/2006 | Heidloff et al. | |
| 2006/0047989 A1* | 3/2006 | Delgado et al. | 713/375 |
| 2006/0176846 A1* | 8/2006 | Miki et al. | 370/328 |
| 2006/0279628 A1* | 12/2006 | Fleming | 348/143 |
| 2007/0016626 A1* | 1/2007 | Castaneda | 707/201 |
| 2007/0016676 A1* | 1/2007 | Breuer et al. | 709/225 |
| 2007/0094672 A1 | 4/2007 | Hayton et al. | |
| 2007/0179993 A1* | 8/2007 | Arruza | 707/202 |
| 2007/0185826 A1 | 8/2007 | Brice et al. | |
| 2009/0006367 A1 | 1/2009 | Jacob et al. | |

* cited by examiner

RANGING SCALABLE TIME STAMP DATA SYNCHRONIZATION

CROSS-REFERENCE TO RELATED APPLICATIONS

This application is a Divisional of U.S. application Ser. No. 11/179,139, filed Jul. 12, 2005, now U.S. Pat. No. 8,001,076, entitled "RANGING SCALABLE TIME STAMP DATA SYNCHRONIZATION," the entirety of which is incorporated herein by reference.

BACKGROUND OF THE INVENTION

1. Field of the Invention

The present invention relates to data synchronization and more particularly to time stamp based data synchronization.

2. Description of the Related Art

Data synchronization refers to the harmonization of a single, operable data set disposed in multiple locations. Data synchronization is most often associated with remote computing where a duplicate of a master data set is manipulated remotely from the remote data set. At an opportune moment, changes to the duplicate data set and changes to the master data set can be harmonized with one another by determining which items in the data set have changed and which have not changed. In the event where a data item has changed both in the duplicate and in the master data set, a conflicts policy can be applied to determine which data item is to be retained and which data item is to be overwritten.

Data synchronization methodologies range from static methodologies to dynamic methodologies. In a static, naive methodology, each data item in the data set can be compared to one another. Where a conflict is detected, a prevailing rule can be applied to determine which data item to retain and which to discard. Examples include server-modification-wins and client-modification-wins. In a dynamic methodology, changes to data items can be tracked in a log so that only items flagged in the log are synchronized, albeit through the use of a prevailing rule.

Advanced, server based data synchronization often uses time stamping concepts to resolve synchronization conflicts between modified data items in a data set. In the time stamp methodology, whenever a data item is added, deleted or changed, a time stamp indicating the time of the change can be associated with the data item. During synchronization, the time stamps between data items in a data set can be compared and the most recently time stamped data item is presumed to be the valid data item. The other data item can be discarded. As it will be recognized by the skilled artisan, however, the success of the time stamping methodology depends largely on the synchronization of the times of the computing platforms performing the data synchronization. Where one clock runs faster than the other, unintended results can occur.

Generally, synchronization the clocks of different computing platforms can be achieved in multiple ways. For instance, it is well known to refer to a third party source for a common time. Specifically, both computing platforms can obtain an accurate time by referencing a third party, trusted time provider such as a network accessible atomic clock. Other methodologies rely upon established network time exchange protocols, such as the Network Time Protocol or the Digital Time Service. Notwithstanding, referencing a common time across a widely distributed system can inhibit the scalability of the system. Moreover, in many cases a common time server may not be available because of corporate security policies or the administrative overhead of maintaining another server.

Accordingly, it would desirable to perform data synchronization for a data processing system based upon time stamps without inhibiting the scalability of the data processing system.

BRIEF SUMMARY OF THE INVENTION

Embodiments of the present invention address deficiencies of the art in respect to time stamp based data synchronization and provide a novel and non-obvious method, system and computer program product for scalable, ranging time stamp based data synchronization. In an embodiment of the invention, a ranging time stamp synchronization method can include computing a time range for a specified time, and producing time stamp synchronization anchors using the time range for each of the anchors. Optionally, a drift value can be computed for the time range and the computing and producing steps can be repeated when the drift value exceeds a threshold. Finally, the anchors can be used to determine whether to update data items in a remote data source in the remote host computing platform with data items from a primary data source in the primary host computing platform.

In one aspect of the invention, computing a time range for a specified time can include computing an error value for clocks disposed respectively in a remote host computing platform and a primary host computing platform communicatively coupled to one another, and identifying a maximum and minimum time for the time range based upon the computed error value. In another aspect of the embodiment, computing a time range for a specified time can include computing both an error value and an offset for clocks disposed respectively in a remote host computing platform and a primary host computing platform communicatively coupled to one another, and identifying a maximum and minimum time for the time range based upon the computed error value and offset.

Computing an error value for clocks disposed respectively in a remote host computing platform and a primary host computing platform communicatively coupled to one another can include obtaining a lapsed period of time between a request for time from the remote host computing platform and receiving the time from the remote host computing platform, and halving the lapsed period to produce a time distance to the remote host computing platform. Subsequently, the time distance can be added to a known accuracy for a clock in the primary host computing platform to produce the error value. Moreover, the time distance can be added to a difference between the received time and a time when the received time is received to produce the offset.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for scalable, ranging time stamp based data synchronization. In accordance with an embodiment of the present invention, a time range can be computed for time stamp synchronization anchors based upon a minimum and maximum time computed for each anchor point in a time range. The minimum and maximum time for each synchronization anchor can be determined based upon an offset and error computed during a re-synchronization process with a remote computing platform. In this way, accurate and efficient data synchronization can be performed without relying upon a common, third party time source.

Figure 1:
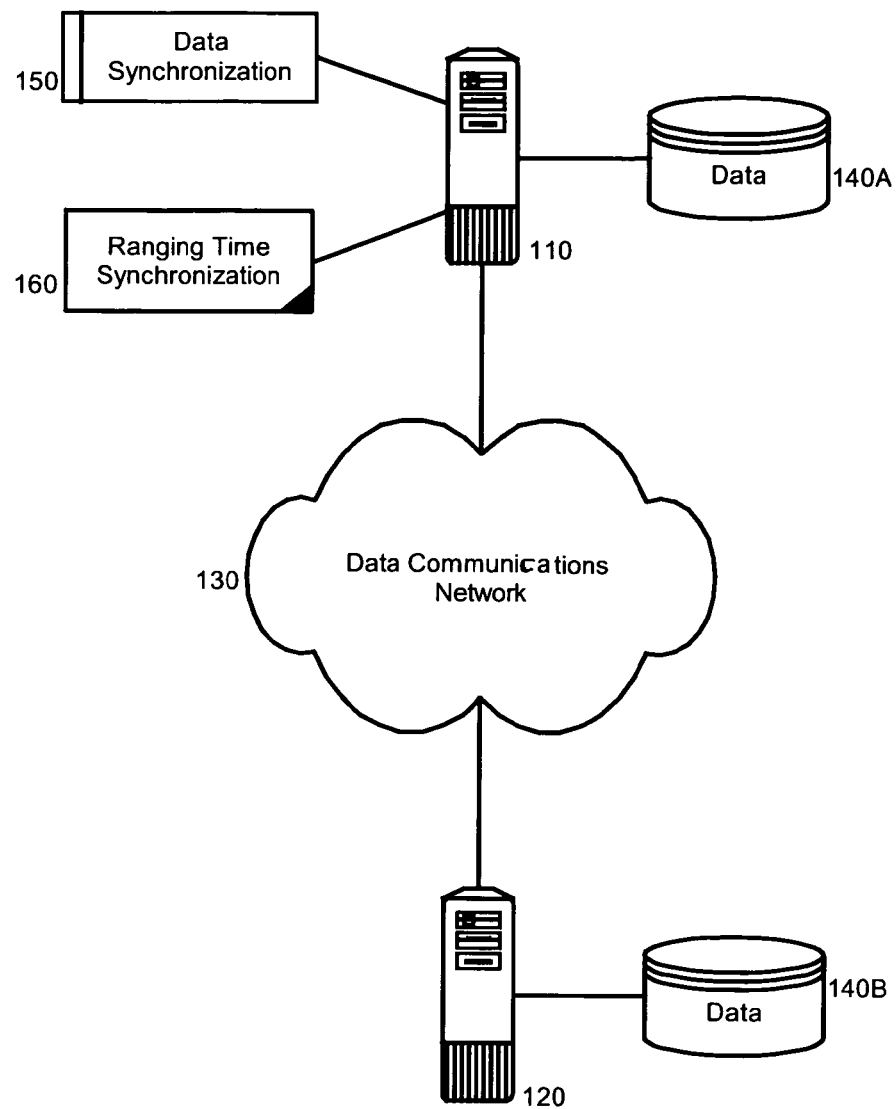
FIG. 1 is a data processing system configured for scalable, ranging time stamp based data synchronization.

In more particular illustration, FIG. 1 is a data processing system configured for scalable, ranging time stamp based data synchronization. The data processing system can include a primary data source 140A coupled to a primary host computing platform 110 and a remote data source 140B coupled to a remote host computing platform 120. The primary host computing platform 110 can be communicatively linked to the remote host computing platform 120 over the data communications network 130.

The primary host computing platform 110 can include data synchronization logic 150. The data synchronization logic 150 can include program code enabled to serve updated data in the primary data source 140A to the remote data source 140B. The updated data can be selected based upon time stamps such that only updated data having a time stamp falling within a selected range of time can be provided as an update to the remote data source 140B. To that end, time stamp synchronization anchors can be used to establish the selected range. Yet, unlike ordinary time stamp synchronization anchors, the time stamp synchronization anchors of the present invention can be ranging time stamp synchronization anchors which account for time synchronization errors between the primary host computing platform 110 and the remote host computing platform 120.

To facilitate the computation of the ranging time stamp synchronization anchors, ranging time stamp synchronization process 160 can be coupled to the data synchronization logic 150. The ranging time stamp synchronization process 160 can identify error and offset values during a resynchronization process with the remote host computing platform 120. Utilizing the error and offset values, a maximum and minimum time can form a range about an actual time in the remote host computing platform 110 such that when last and next time stamp synchronization anchors are produced, the minimum boundary of the last time stamp synchronization anchor and the maximum boundary of the next time stamp synchronization anchor can be used as the time stamp range in identifying data in the primary data source 140A to be provided as updates to the remote data source 140B.

Figure 2:
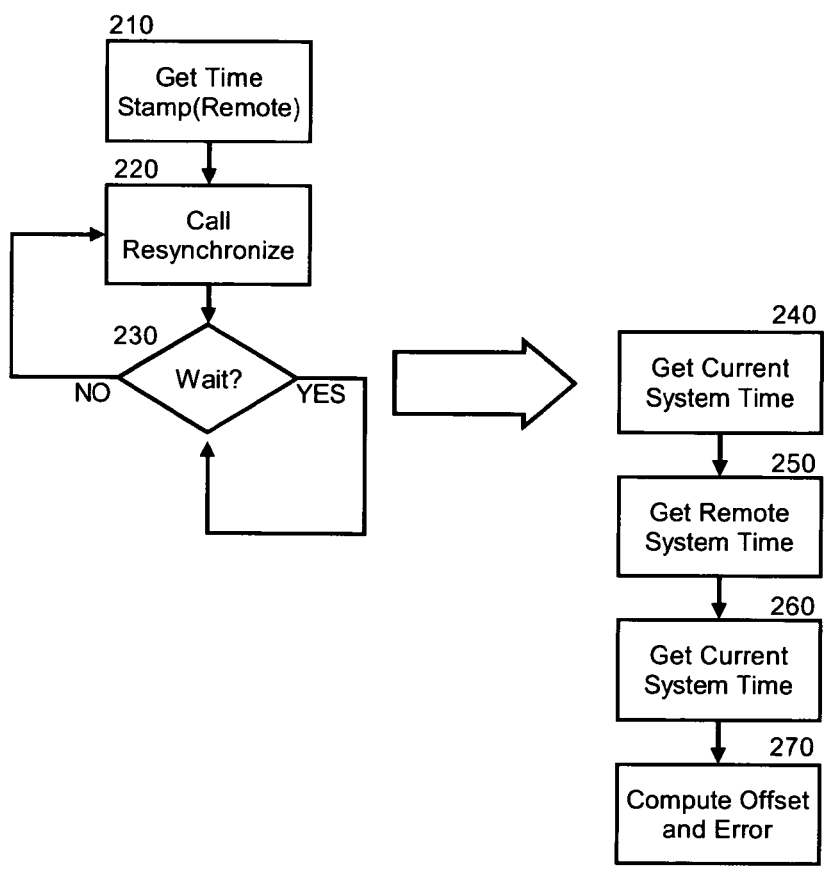
FIG. 2 is a flow chart illustrating a process for re-synchronizing the data processing system of FIG. 1 to produce ranging time stamps; and, FIG. 3 is a flow chart illustrating a process for performing data synchronization using ranging time stamp synchronization anchors.

In further illustration, FIG. 2 is a flow chart illustrating a process for re-synchronizing the data processing system of FIG. 1 to produce ranging time stamps. Beginning in block 210, a time stamp can be retrieved from a remote host computing device. In block 220, a resynchronization process can be initiated to produce error and offset values for use in generating ranging time stamp synchronization anchors. Subsequently, a period of time can elapse in decision block 230 before another resynchronization can be initiated.

The resynchronization process can begin in block 240. In block 240, a current system time can be retrieved for the primary host computing platform. Subsequently, in block 250 a time can be retrieved from the remote host computing platform. Thereafter, in block 260 a current system again can be retrieved for the primary host computing platform. In block 270, the difference between the latter retrieved system time and the initially retrieved system time can be determined as can a mean time based upon the difference therein producing a roundtrip delay value.

The resulting error can be the sum of the roundtrip delay and the distance as shown by the following equations:

$$\delta = t_a - t_b$$
$$\varepsilon = \lambda + \rho$$
$$\rho = t_r - t_b + \lambda$$
$$\lambda = \frac{|\delta|}{2}$$
$$\varepsilon \leq \varepsilon_{max}$$

In the shown equations, the variable $\delta$ is the round-trip delay between requesting and receiving a time from the remote computing platform, the variable $\varepsilon$ is the error, the variable $\lambda$ is the distance, the variable $\rho$ is the accuracy of the clock and the variable $t_r$ is the retrieved time from the remote computing platform. An offset further can be computed in block 270 based upon the sum of the time retrieved from the remote host computing platform, the computed error and the known accuracy of the clock of the primary host computing platform.

Notably, the resynchronization process can be repeated often enough to compute and utilize a drift value for the clocks. Specifically, the drift value is the value which indicates the rate at which the synchronized clocks of the primary and remote host computing platforms deviate from one another. In this respect, a drift value can be computed as the difference between the mean time of the current synchronization time stamp and a previous synchronization time stamp divided by the actual elapsed time in between producing both time stamps. Essentially, the drift value is the first derivative of the offset with respect to time. The drift value can be added to the maximum and minimum equations to produce an even more accurate range and the resynchronization process can be configured to occur whenever the drift value exceeds a specified threshold.

Figure 3:
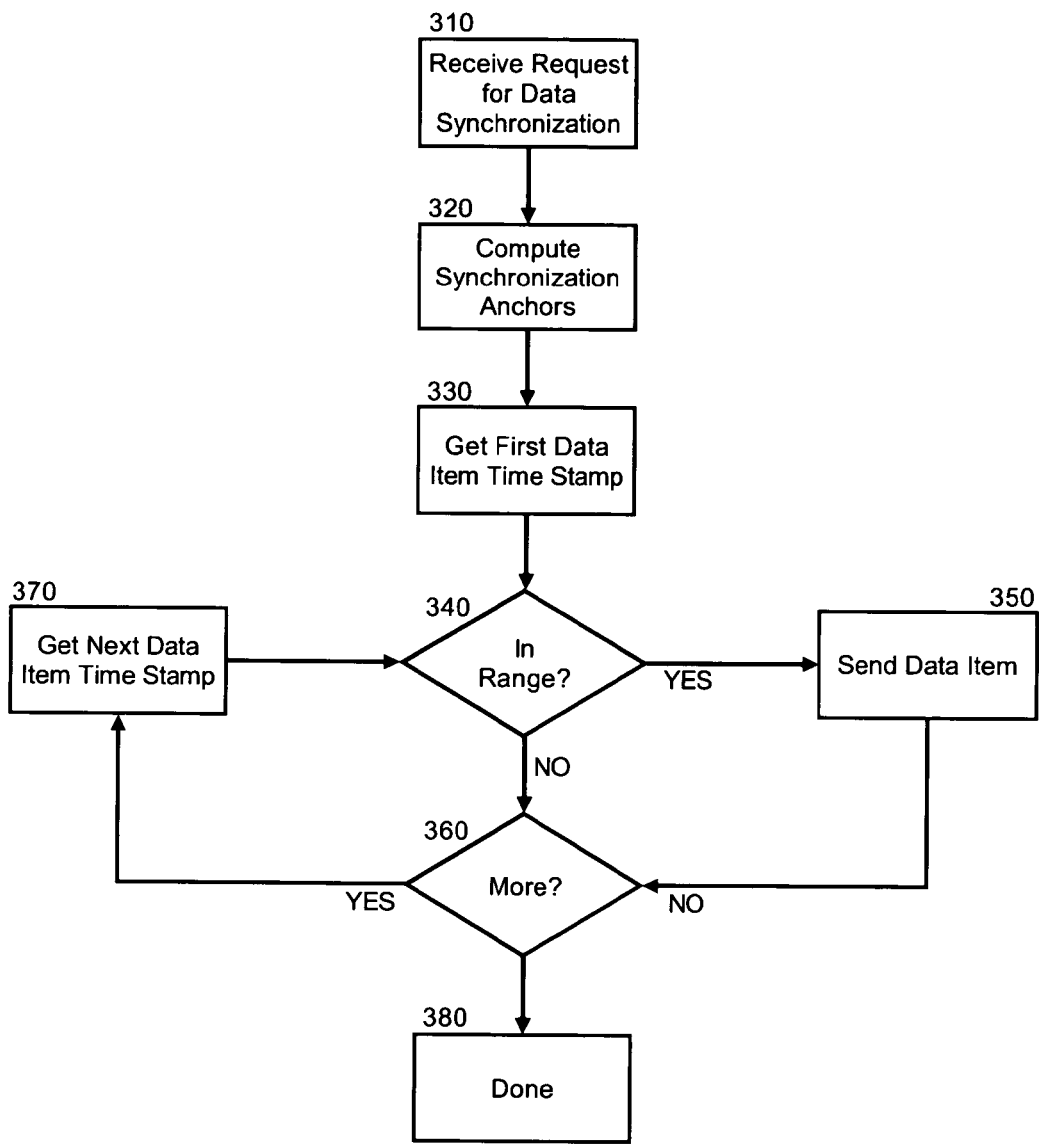

Utilizing the computed error and offset, time stamp synchronization anchors can be produced during a requested data synchronization operation. More particularly, FIG. 3 is a flow chart illustrating a process for performing data synchronization using ranging time stamp synchronization anchors. As shown in FIG. 3, in block 310 a request for data synchronization can be received for updated data falling within a specified time range. Subsequently, in block 320 a last and next synchronization anchor can be computed based upon the specified time range. Each anchor can include a minimum time value and a maximum time value. The minimum time value can be the selected time added to the offset less the error value. The maximum time value, by comparison, can be the selected time added to the offset in addition to the error value. The remote time, in turn, can be guaranteed to fall within the range of the minimum and maximum time values.

In block 330, a first data item from the primary data source can be retrieved and a time stamp for the retrieved data can be compared to the range defined by the minimum time of the last time stamp synchronization anchor and the maximum time of the next time stamp synchronization anchor. If the data item falls within the range in decision block 340, the data item 350 can be provided to the remote data source as an update in block 350. Subsequently, in decision block 360, if more data items remain to be examined, in block 370 a next data item can be retrieved for processing. When no further data items remain to be processed, the data synchronization process can end in block 380.

It will be recognized by the skilled artisan that the use of a ranging timestamp in rare circumstances can retrieve an update that the client already has received in the synchronization context. This "ghost update" need not affect the integrity of the data store on either the client or server, however. Rather, in the event of conflict a possible ghost update can be identified as an update that falls inside the range of the last time anchor. This circumstance can be handled with a conflict resolution policy that specifies that a real update always wins over a possible ghost update. In this way, the network bandwidth saved in consequence of the foregoing methodology and the convenience of not having to maintain a time server can outweigh any wasted bandwidth in synchronizing ghost updates while the integrity of the synchronized data can always be maintained.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

I claim:

1. A method for performing data synchronization between a primary data source in a primary host computing platform and a remote data source in a remote host computing platform, comprising:
   receiving a request for data synchronization for updated data falling within a specified time range;
   computing ranging time stamp synchronization anchors based on the specified time range, wherein the ranging time stamp synchronization anchors correspond to a minimum value and a maximum value determined based on the specified time range, a time synchronization error between the primary host computing platform and the remote host computing platform, and also an offset being a sum of a time retrieved from the remote host computing platform, the time synchronization error, and also an accuracy of a clock of the primary host computing platform; and
   performing data synchronization using the computed ranging time stamp synchronization anchors without relying upon a third party time source common to both the primary host computing platform and the remote host computing platform.

2. The method of claim 1, wherein the specified time range is between a first time and a second time, and the ranging time stamp synchronization anchors include a first ranging time stamp synchronization anchor corresponding to the first time and a second ranging time stamp synchronization anchor corresponding to the second time.

3. The method of claim 2, wherein the first ranging time stamp synchronization anchor includes a first minimum value and a first maximum value, and the second ranging time stamp synchronization anchor includes a second minimum value and a second maximum value.

4. The method of claim 3, wherein the data synchronization is performed for updated data falling within a time range between the first minimum value and the second maximum value.

5. The method of claim 1, wherein the time synchronization error is computed by
   obtaining a lapsed period of time between a request for time from the remote host computing platform and receiving the time from the remote host computing platform;
   halving the lapsed period to produce a time distance to the remote host computing platform; and
   adding the time distance to a known accuracy for a clock in the primary host computing platform.

6. The method of claim 1, wherein the offset is computed by
   obtaining a lapsed period of time between a request for time from the remote host computing platform and receiving the time from the remote host computing platform;
   halving the lapsed period to produce a time distance to the remote host computing platform; and
   adding the time distance to a difference between a retrieved time from the remote host computing platform and a time when the retrieved time is received at the primary host computing platform.

7. The method of claim 1, further comprising:
calculating a drift value indicating a rate at which a clock in the primary host computing platform deviates from a clock on the remote host computing platform.

8. The method of claim 1, wherein the minimum time is determined by selecting a time value between the specified time range and adding the selected time value to the offset and subtracting the time synchronization error and wherein the maximum time is determined by an addition of the selected time value to the offset and also to the time synchronization error.

9. A ranging time stamp data synchronization system, comprising:
a primary data source disposed in a primary host computing platform;
a remote data source disposed in a remote host computing platform communicatively linked to the primary host computing platform;
data synchronization logic coupled to the primary data source for performing data synchronization between the primary data source in the primary host computing platform and the remote data source in the remote host computing platform; and
a ranging time stamp synchronization processor coupled to the data synchronization logic, the processor being configured to
receive a request for data synchronization for updated data falling within a specified time range;
compute ranging time stamp synchronization anchors based on the specified time range, wherein the ranging time stamp synchronization anchors correspond to a minimum value and a maximum value determined based on the specified time range, a time synchronization error between the primary host computing platform and the remote host computing platform, and also an offset being a sum of a time retrieved from the remote host computing platform, the time synchronization error, and also an accuracy of a clock of the primary host computing platform; and
perform data synchronization using the computed ranging time stamp synchronization anchors without relying upon a third party time source common to both the primary host computing platform and the remote host computing platform.

10. The system of claim 9, wherein the specified time range is between a first time and a second time, and the ranging time stamp synchronization anchors include a first ranging time stamp synchronization anchor corresponding to the first time and a second ranging time stamp synchronization anchor corresponding to the second time.

11. The system of claim 10, wherein the first ranging time stamp synchronization anchor includes a first minimum value and a first maximum value, and the second ranging time stamp synchronization anchor includes a second minimum value and a second maximum value.

12. The system of claim 11, wherein the data synchronization is performed for updated data falling within a time range between the first minimum value and the second maximum value.

13. The system of claim 9, wherein time synchronization error is computed by
obtaining a lapsed period of time between a request for time from the remote host computing platform and receiving the time from the remote host computing platform;
halving the lapsed period to produce a time distance to the remote host computing platform; and
adding the time distance to a known accuracy for a clock in the primary host computing platform.

14. The system of claim 9, wherein the offset is computed by
obtaining a lapsed period of time between a request for time from the remote host computing platform and receiving the time from the remote host computing platform;
halving the lapsed period to produce a time distance to the remote host computing platform; and
adding the time distance to a difference between a retrieved time from the remote host computing platform and a time when the retrieved time is received at the primary host computing platform.

15. A computer program product comprising a non-transitory computer usable storage medium having stored therein computer usable program code for performing data synchronization between a primary data source in a primary host computing platform and a remote data source in a remote host computing platform, the computer usable program code which for when executed by a computer hardware device, causes the computer hardware device to perform
receiving a request for data synchronization for updated data falling within a specified time range;
computing ranging time stamp synchronization anchors based on the specified time range, wherein the ranging time stamp synchronization anchors correspond to a minimum value and a maximum value determined based on the specified time range, a time synchronization error between the primary host computing platform and the remote host computing platform, and also an offset being a sum of a time retrieved from the remote host computing platform, the time synchronization error, and also an accuracy of a clock of the primary host computing platform; and
performing data synchronization using the computed ranging time stamp synchronization anchors without relying upon a third party time source common to both the primary host computing platform and the remote host computing platform.

16. The computer program product of claim 15, wherein the specified time range is between a first time and a second time, and the ranging time stamp synchronization anchors include a first ranging time stamp synchronization anchor corresponding to the first time and a second ranging time stamp synchronization anchor corresponding to the second time.

17. The computer program product of claim 16, wherein the first ranging time stamp synchronization anchor includes a first minimum value and a first maximum value, and the second ranging time stamp synchronization anchor includes a second minimum value and a second maximum value.

18. The computer program product of claim 17, wherein the data synchronization is performed for updated data falling within a time range between the first minimum value and the second maximum value.

19. The computer program product of claim 15, wherein the time synchronization error is computed by
obtaining a lapsed period of time between a request for time from the remote host computing platform and receiving the time from the remote host computing platform;
halving the lapsed period to produce a time distance to the remote host computing platform; and
adding the time distance to a known accuracy for a clock in the primary host computing platform.

20. The computer program product of claim 15, wherein the offset is computed by
- obtaining a lapsed period of time between a request for time from the remote host computing platform and receiving the time from the remote host computing platform;
- halving the lapsed period to produce a time distance to the remote host computing platform; and
- adding the time distance to a difference between a retrieved time from the remote host computing platform and a time when the retrieved time is received at the primary host computing platform.

\* \* \* \* \*